US008590009B2

(12) United States Patent
Hirata

(10) Patent No.: US 8,590,009 B2
(45) Date of Patent: Nov. 19, 2013

(54) COMPUTER SYSTEM FOR PORT FORWARDING

(75) Inventor: Yutaka Hirata, Tokyo (JP)

(73) Assignee: NEC Corporation, Tokyo (JP)

( * ) Notice: Subject to any disclaimer, the term of this patent is extended or adjusted under 35 U.S.C. 154(b) by 905 days.

(21) Appl. No.: 12/268,570

(22) Filed: Nov. 11, 2008

(65) Prior Publication Data

US 2009/0125982 A1 May 14, 2009

(30) Foreign Application Priority Data

Nov. 13, 2007 (JP) ................................. 2007-293832

(51) Int. Cl.
*H04L 29/06* (2006.01)

(52) U.S. Cl.
USPC .................. 726/2; 726/12; 726/18; 713/150; 713/153; 713/155; 713/156

(58) Field of Classification Search
USPC .......... 726/2, 12, 18; 713/150, 153, 155–156
See application file for complete search history.

(56) References Cited

U.S. PATENT DOCUMENTS

| 6,842,449 | B2 * | 1/2005 | Hardjono ...................... 370/352 |
| 7,127,328 | B2 * | 10/2006 | Ransom ........................ 700/286 |
| 2002/0095586 | A1 | 7/2002 | Doyle et al. | |
| 2005/0028000 | A1 | 2/2005 | Bulusu et al. | |
| 2007/0192604 | A1 | 8/2007 | Chiasson et al. | |
| 2007/0204332 | A1 | 8/2007 | Pan | |
| 2008/0267178 | A1 * | 10/2008 | Emmerich et al. ............ 370/389 |

FOREIGN PATENT DOCUMENTS

| EP | 1662692 A2 * | 5/2006 |
| JP | 2004334741 A | 11/2004 |
| JP | 2005321970 A | 11/2005 |
| JP | 2005332373 A | 12/2005 |
| JP | 2006-501581 A | 1/2006 |
| JP | 2006287692 A | 10/2006 |
| JP | 2008-517390 A | 5/2008 |
| WO | 2006043463 A | 4/2006 |

OTHER PUBLICATIONS backup. (1998). In Dictionary of Communications Technology: Terms, Definitions and Abbreviations, Wiley. Retrieved from http://www.credoreference.com/entry/wileycommtech/backup.*
Japanese Office Action for JP2007-293832 issued Sep. 29, 2009.

* cited by examiner

*Primary Examiner* — Kambiz Zand
*Assistant Examiner* — Imhotep Durham

(57) ABSTRACT

A computer system includes multiple computer modules each including at least a calculator and a storing unit. A first computer module of the computer modules includes: a storing unit that stores authentication information for connection with a second computer module of the computer modules; an authenticator that authenticates an information processing device accessing the first computer module, and allows the information processing device to access thereto based on an authentication result; and a relay connector that connects the information processing device allowed to access the first computer module to the second computer module based on the authentication information.

16 Claims, 10 Drawing Sheets

*FIG. 3*

| | | |
|---|---|---|
| IP ADDRESS OF CELL 1 | KEY TYPE | PUBLIC KEY OF CELL 1 |
| IP ADDRESS OF CELL 2 | KEY TYPE | PUBLIC KEY OF CELL 2 |
| IP ADDRESS OF CELL 3 | KEY TYPE | PUBLIC KEY OF CELL 3 |
| IP ADDRESS OF CELL 4 | KEY TYPE | PUBLIC KEY OF CELL 4 |
| IP ADDRESS OF CELL 5 | KEY TYPE | PUBLIC KEY OF CELL 5 |
| IP ADDRESS OF CELL 6 | KEY TYPE | PUBLIC KEY OF CELL 6 |
| IP ADDRESS OF CELL 7 | KEY TYPE | PUBLIC KEY OF CELL 7 |

14

COMPUTER SYSTEM FOR PORT FORWARDING

INCORPORATION BY REFERENCE

This application is based upon and claims the benefit of priority from Japanese Patent Application No. 2007-293832, filed Nov. 13, 2007, the entire disclosure of which, including specification, claims, drawings and summary, is incorporated herein by reference in its entirety.

BACKGROUND OF THE INVENTION

1. Field of the Invention

The present invention relates to a technology of a computer system for port forwarding.

2. Description of the Related Art

All patents, patent applications, patent publications, scientific articles, and the like, which will hereinafter be cited or identified in the present application, are incorporated by reference in their entirety in order to describe more fully the state of the art to which the present invention pertains.

Server systems each including multiple cells each functioning as a computer including a calculator and a storing unit have been implemented as a computer system used for a core system. A cell is, for example, a baseboard including a calculator corresponding to a motherboard of a personal computer. Firmware (hereinafter, "BMCFW") for controlling hardware that is a cell operates on the cell. A web console is used to manage the cell and the BMCFW. In other words, a user or an administrator accesses each cell from a computer of the user or the administrator through a network, and performs remote operation on the web console (for example, an operation screen).

Hereinafter, an example of access to a server system is explained with reference to FIG. 10. A user terminal 120 is a computer (personal computer) operated by a user. The user terminal 120 includes a web browser 121 and an SSH (secure shell) client 122. The web browser 121 is software for browsing websites on the Internet and preliminarily installed in the user terminal 120 in general. The SSH client 122 is software for remotely operating a remote host and used in lieu of the conventional TELNET (telecommunication network). Since the SSH client 122 is not usually installed in the user terminal 120, a user has to select an SSH client product to be installed in the user terminal 120.

A server system 110 shown in FIG. 10 is one server system. The server system 110 includes eight cells, i.e., cell 00 to cell 07. One or more of the cells 00 to 07 are combined to operate an OS (operating system).

One method for the user terminal 120 to perform secure access between the web browser 121 and the cells is SSL (secure sockets layer) connection. The SSL connection is a system for performing web server authentication and encoding of a communication path using HTTPS (hypertext transfer protocol over secure sockets layer). Data called an SSL certificate is required in the BMCFW to implement the SSL connection. For this reason, in the case of FIG. 10, SSL certificates are preliminarily purchased from a certificate authority and installed in the BMCFWs of the cells 00 to 07, respectively, before operations of the system commence. As a result, the SSL certificates are referred to upon the SSL connection from the web browser 121 to verify the validity of the server system. The SSL certificates included in the cells are different from one another. The network 109 is a LAN (local area network), and communication among the cells is performed through the network 109.

As a method of implementing secure access between the user terminal 120 and the cells 00 to 07 in addition to the SSL connection, there is a method called HTTP over SSH utilizing SSH port forwarding. The HTTP over SSH is a method in which the HTTP protocol is transmitted on an SSH communication path, and called port transmission or port forwarding. Specifically, in the method utilizing the SSH, an SSH port forwarding connection to the BMCFW of each cell is established, then connection to the BMCFW through a local port is performed on a web browser (called HTTP over SSH), and thereby a web console is securely utilized. A reference example of the port forwarding is disclosed in Japanese Unexamined Patent Application, Fast Publication, No. 2006-287692.

However, the access method has the following problems. When the SSL connection is performed on the web console, the server system provider has to purchase the SSL certificate for each cell from the certificate authority, causing higher costs for purchasing and maintaining the SSL certificates and time-consuming settings for a high-end server including a larger number of cells.

In addition, SSH-client software has to be installed in a user computer to perform the web console access using the SSH port forwarding, which is time-consuming. Further, a user has to manage a public key of each cell in the SSH server, which is time-consuming maintenance.

SUMMARY OF THE INVENTION

A computer system according to one aspect of the present invention includes multiple computer modules each including at least a calculator and a storing unit. A first computer module of the computer modules may include: a storing unit that stores authentication information for connection with a second computer module of the computer modules; an authenticator that authenticates an information processing device accessing the first computer module and allows the information processing device to access thereto based on an authentication result; and a relay connector that connects the information processing device allowed to access the first computer module to the second computer module based on the authentication information.

A computer module according to another aspect of the present invention is connected to another computer module and includes at least a calculator and a storing unit. The computer module may include: a storing unit that stores authentication information for connection with the other computer module; an authenticator that authenticates an information processing device accessing the computer module and allows the information processing device to access thereto based on an authentication result; and a relay connector that connects the information processing device allowed to access the computer module to the other computer module based on the authentication information.

A program according to another aspect of the present invention causes a computer module that is connected to another computer module and includes at least a calculator and a storing unit to implement: an authenticator that authenticates an information processing device accessing to the computer module and allows the information processing device to access thereto based on an authentication result; and a relay connector that connects the information processing device allowed to access the computer module to the other computer module based on authentication information preliminarily stored and for connection with the other computer module.

A relaying method according to another aspect of the present invention is for a first computer module including at least a calculator and a storing unit to connect an information processing device accessing the first computer module to a second computer module. The relaying method may include: authenticating the information processing device; allowing the information processing device to access to the first computer module based on a result at the time of authentication; and connecting the information processing device allowed to access the first computer module to the second computer module based on authentication information preliminarily stored and for connection to the second computer module.

BRIEF DESCRIPTION OF THE DRAWINGS

Objects, features, aspects, and advantages of the present invention will become apparent to those skilled in the art from the following detailed descriptions taken in conjunction with the accompanying drawings, illustrating the embodiments of the present invention, in which:

FIG. 3 shows an example of cell data collected by the cell;

DETAILED DESCRIPTION OF THE INVENTION

Figure 1:
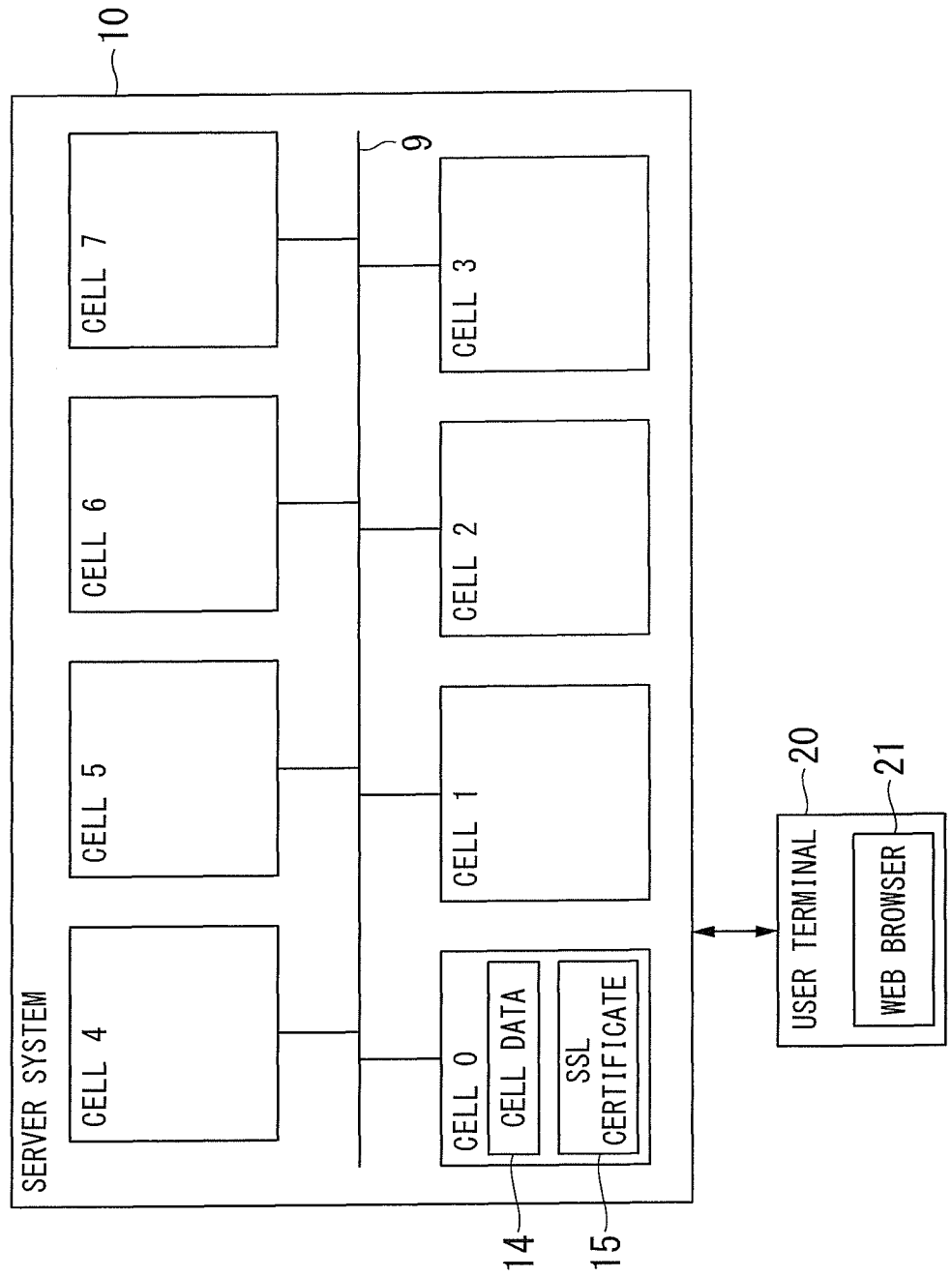
FIG. 1 is a block diagram showing the entire configuration of a server system.
Figure 2:
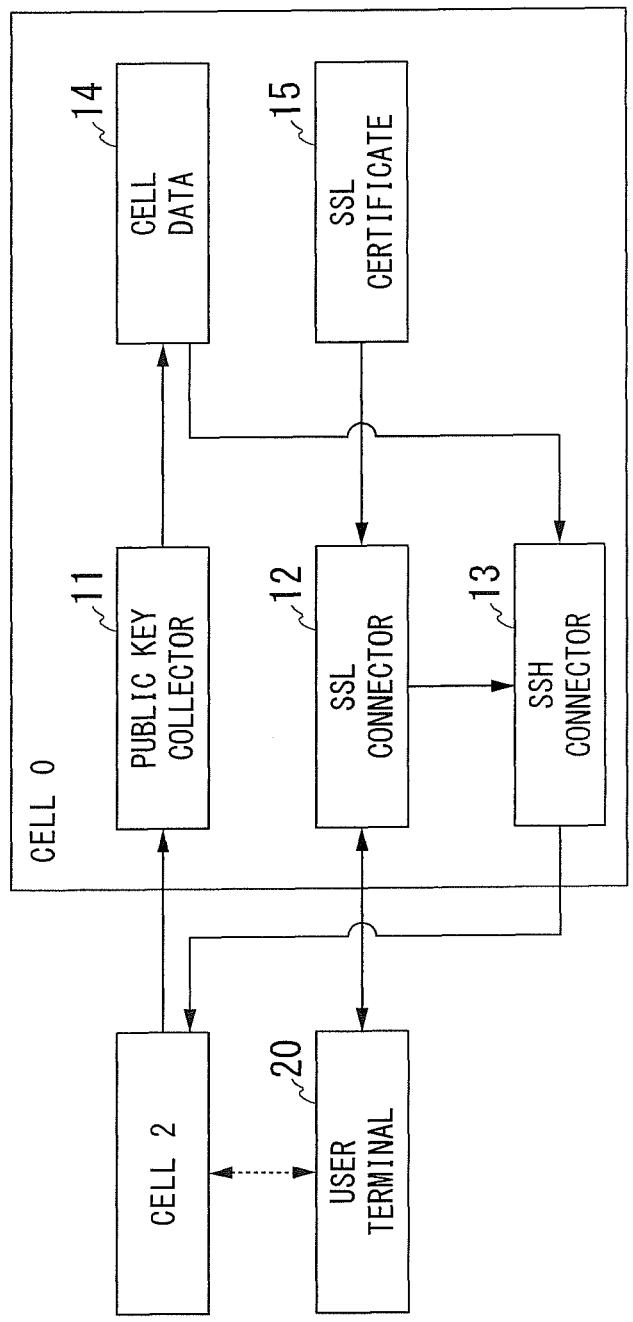
FIG. 2 is a block diagram showing the configuration of a cell.
Figure 4:
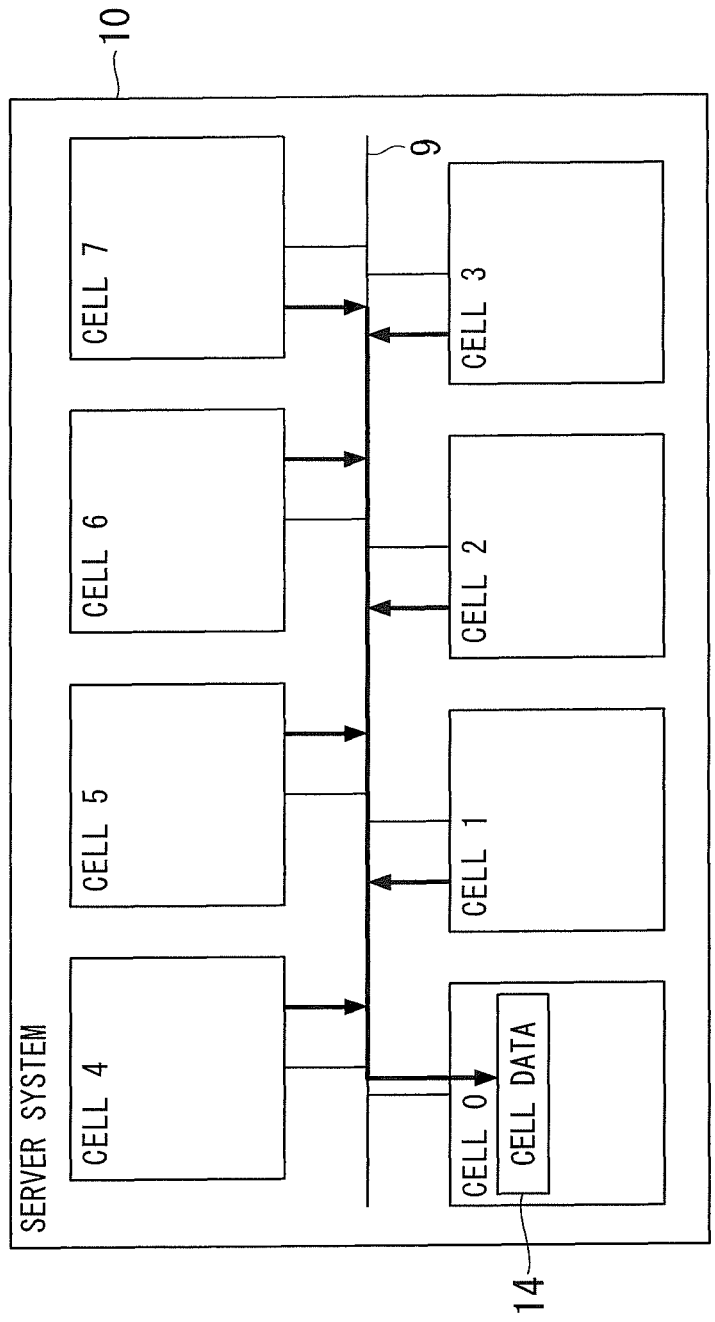
FIG. 4 shows an operation of the server system.
Figure 5:
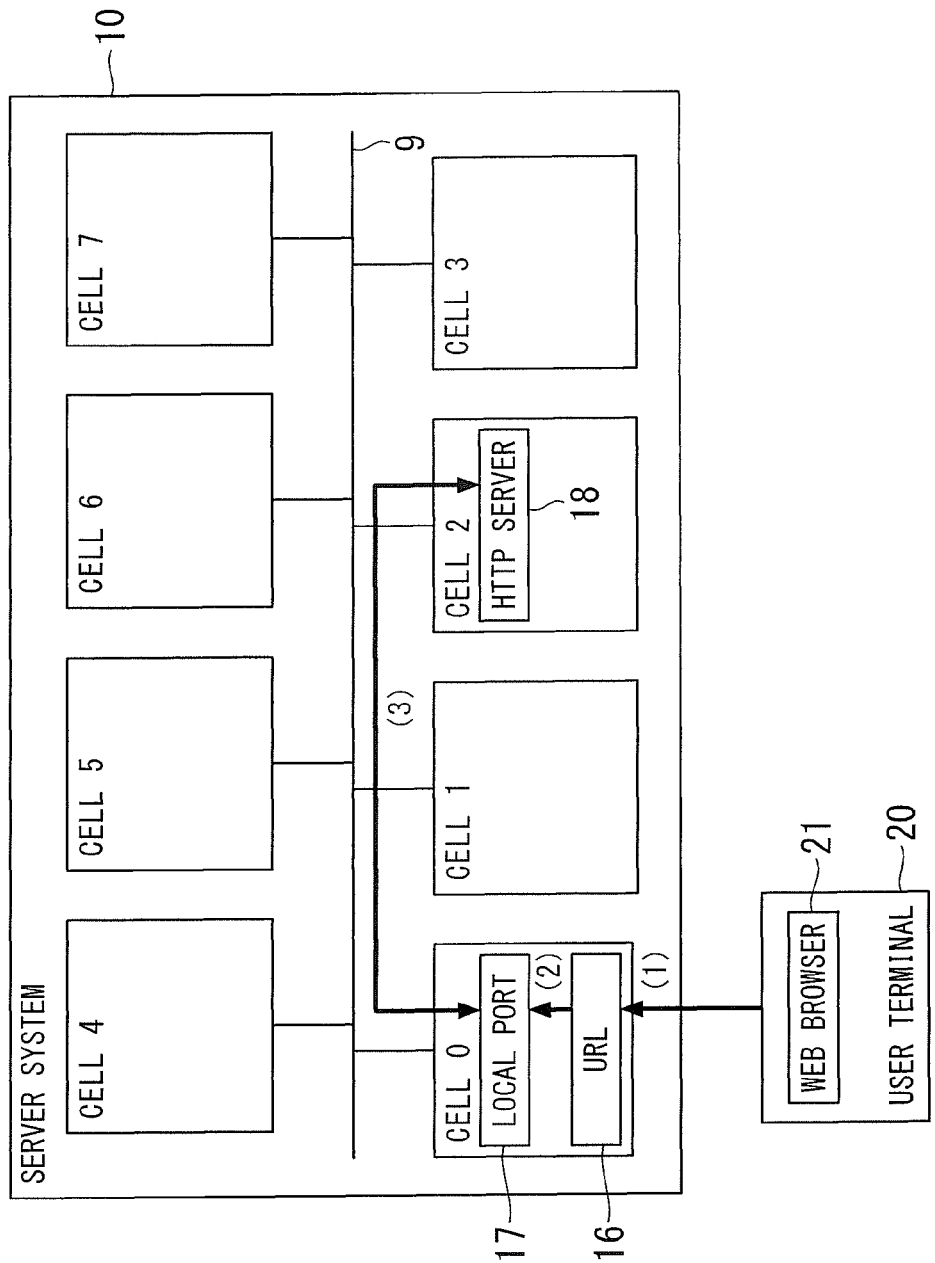
FIG. 5 shows an operation of the server system.
Figure 6:
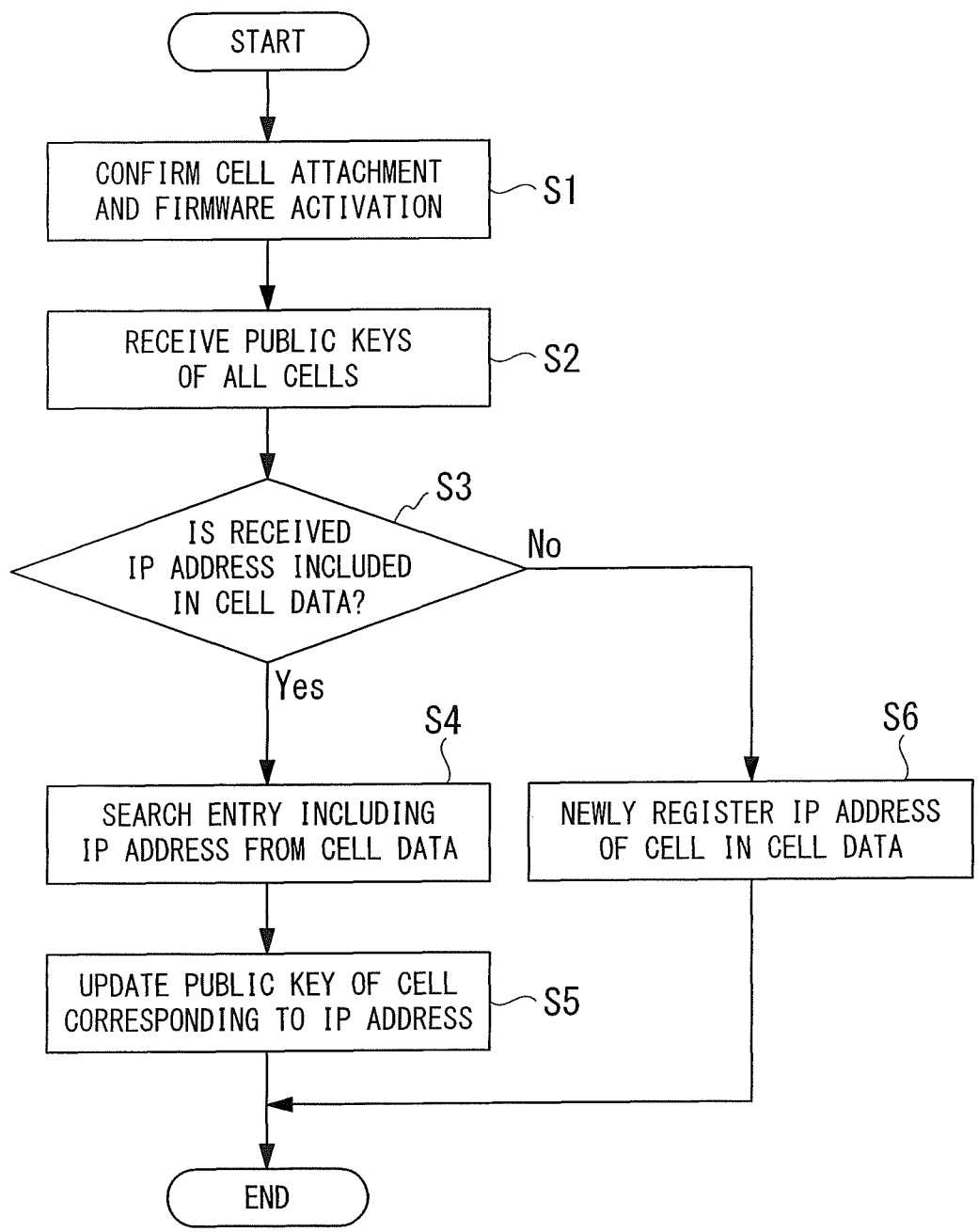
FIG. 6 is a flowchart showing operations of the server system.
Figure 7:
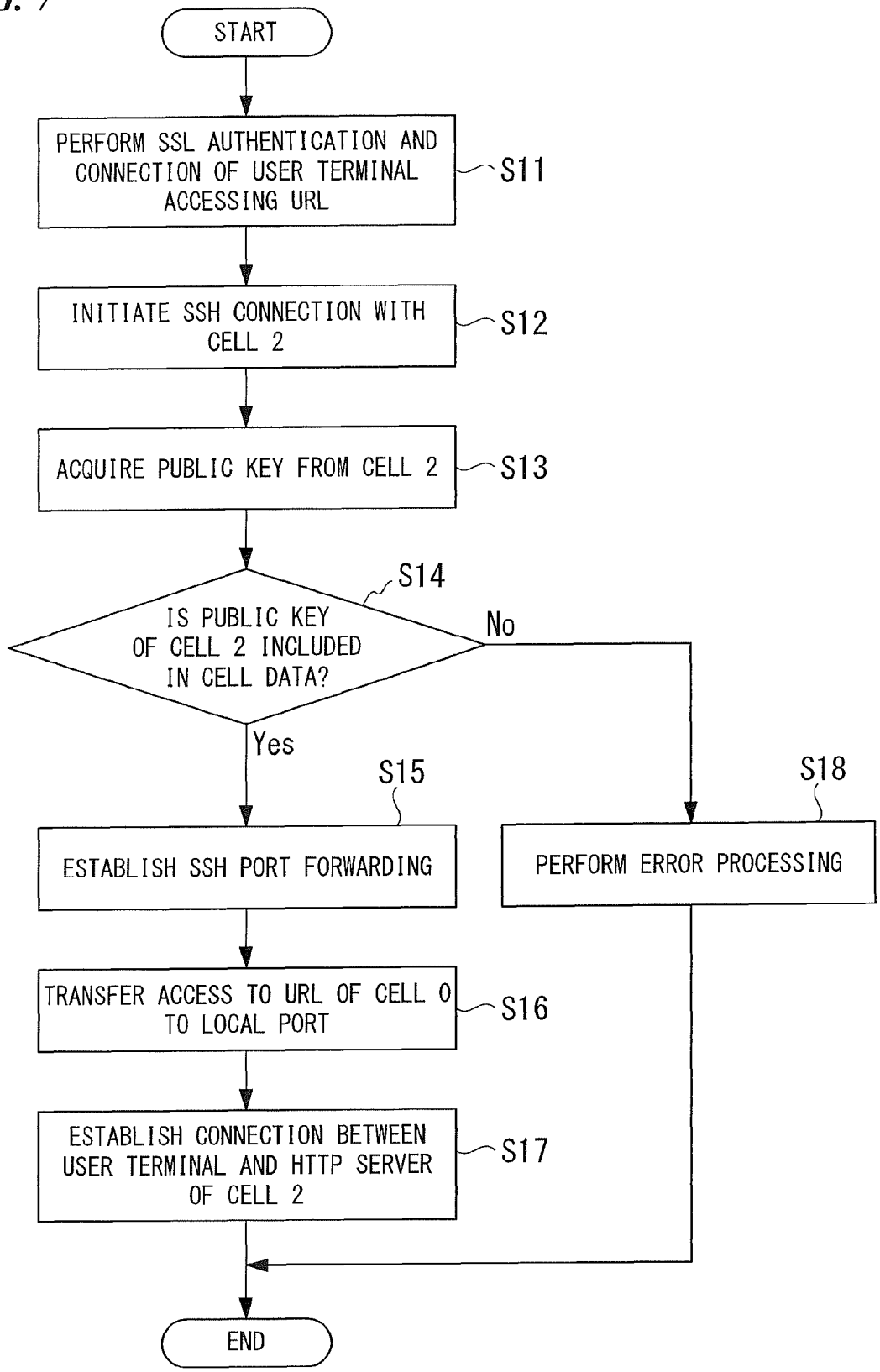
FIG. 7 is a flowchart showing operations of the server system.
Figure 8:
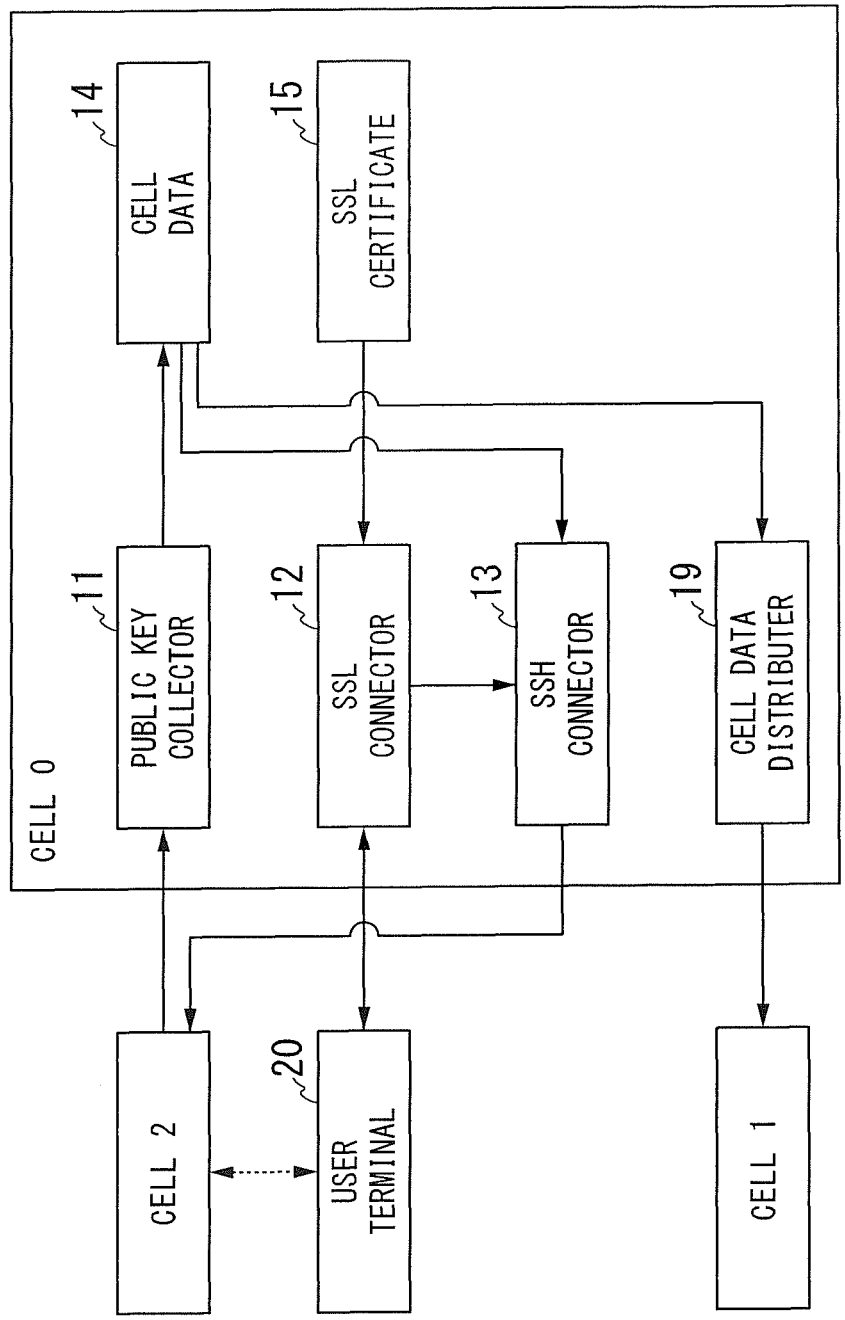
FIG. 8 is a block diagram showing a modified example of the configuration of the cell.
Figure 9:
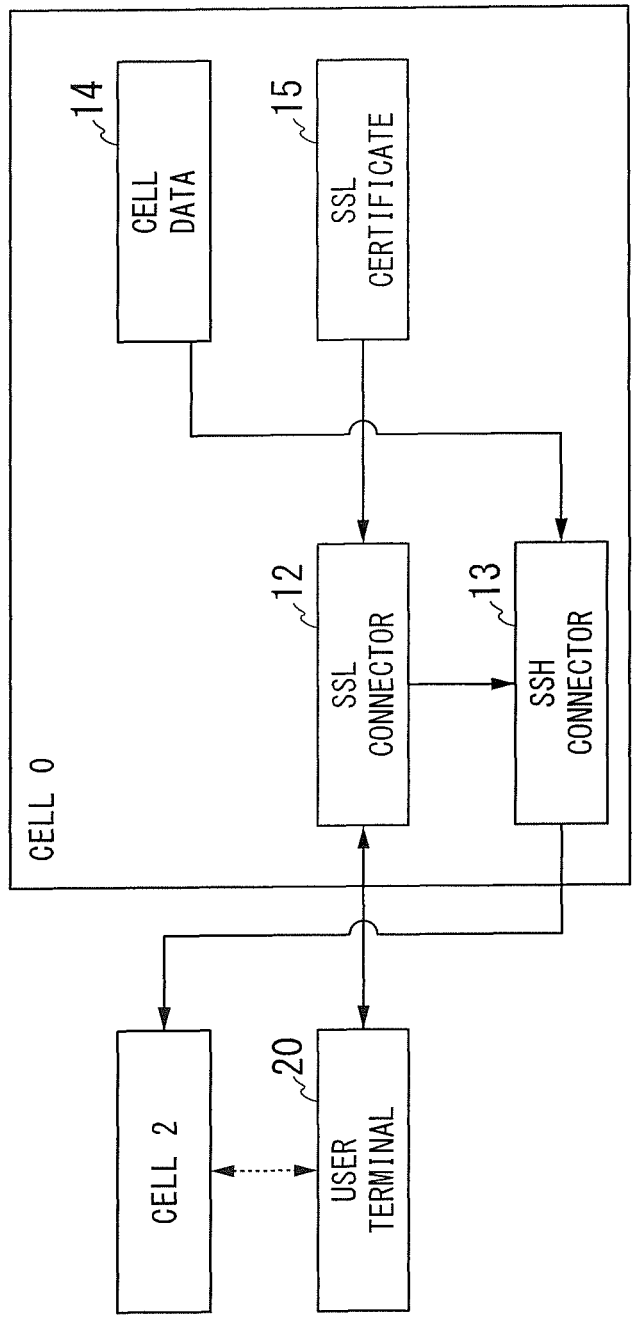
FIG. 9 is a block diagram showing a modified example of the configuration of the cell.
Figure 10:
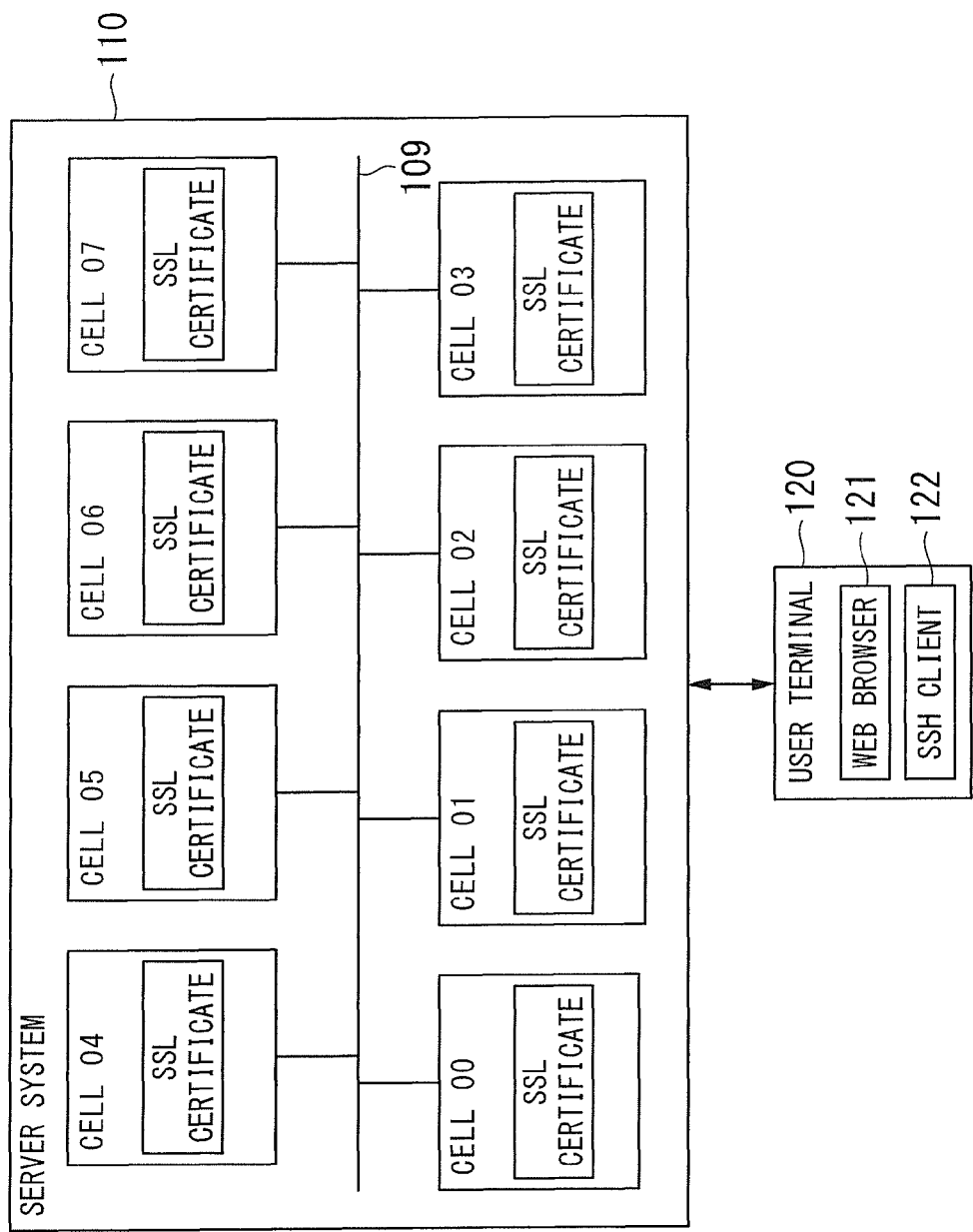
FIG. 10 is a block diagram showing the entire configuration of a conventional server system.

Hereinafter, a first embodiment of the present invention is explained with reference to FIGS. 1 to 9. FIG. 1 is a block diagram showing the entire configuration of a server system. FIG. 2 is a block diagram showing the configuration of a cell. FIG. 3 shows an example of cell data collected by the cell. FIGS. 4 and 5 show operations of the server system. FIGS. 6 and 7 show flowcharts. The FIGS. 8 and 9 are block diagrams showing modified examples of the configuration of the cell.

As shown in FIG. 1, a server system 10 according to the first embodiment includes eight cells of cell 0 to cell 7. Cells 0 to 7 are connected to one another through a network 9 such as a LAN. Thereby, the cells can be communicated with one another. One or more of cells 0 to 7 are combined to operate an OS, and thereby the server system 10 operates as a computer system used for a core system. The number of cells installed in the server system 10 is not limited thereto.

A user terminal 20 is connected to the server system 10 for a user (such as an administrator) to remotely manage a particular cell of the server system 10. The user terminal 20 includes a web browser 21 that is software for browsing websites on the Internet. To remotely manage the particular cell, the user uses a web console (such as an operation screen) of the particular cell using the web browser 21.

Hereinafter, cells 0 to 7 included in the server system 10 are explained. Cells 0 to 7 are computer modules that function as computers each including a calculator and a storing unit. Specifically, each cell is a baseboard including a calculator corresponding to a motherboard of a personal computer. Firmware (hereinafter, "BMCFW") that directly controls hardware that is the cell operates on the cell.

In the first embodiment as shown in FIG. 5, cell 2 functions as an HTTP server and is a target to be remotely managed. Cell 0 is the cell to be directly accessed by the user terminal 20. The user terminal 20 accesses cell 2 through cell 0 and uses a web console of cell 2. Cell 0 has the following configuration to securely connect the user terminal 20 to cell 2.

As shown in FIG. 2, cell 0 includes a public key collector 11, an SSL connector 12, and an SSH connector 13 that are implemented by installation of given programs in the calculator. Cell data 14 including a public key of each cell and an SSL certificate 15 to be used upon authentication of the SSL connection are stored in a storing unit. Additionally, cell 0 includes a URL 16 indicative of a hyperlink to cell 2 as shown in FIG. 5. Further, cell 0 includes a local port 17 that connects the user terminal 20 accessing the URL 16 to an HTTP server 18 of cell 2. The details thereof are explained hereinafter.

The public key collector (collector) 11 is included in each of cells 1 to 7, collects public keys that are authentication information for SSH connection from cells 1 to 7, and stores the public keys of cells 1 to 7 as cell data 14 in the storing unit. Specifically, the public key collector 11 detects activation of each cell 1 to 7, and acquires the public keys of cells 1 to 7 upon the activation. Not only the public keys, but also information concerning IP addresses and key types assigned to cells 1 to 7 are acquired. An example of the cell data 14 collected in this manner is shown in FIG. 3. In the first embodiment as shown in FIG. 3, "IP addresses", "public keys", and "key types" of cells 1 to 7 are stored as the cell data 14. The "key type" is a character string indicative of the kind of the public key. The cell data 14 is stored as a text file, for example.

The SSL connector (authenticator) 12 SSL-authenticates, using the stored SSL certificate 15, the user terminal 20 accessing cell 0 by operation of the web browser 21. If the authentication succeeds, the user terminal 20 is allowed to access cell 0, and secure SSL connection with the user terminal 20 is established using an encoded communication path.

The SSH connector (relay connector) 13 initiates an SSH connection with cell 2 upon detecting that the URL 16 has been clicked on the web browser 21 of the user terminal 20 while the SSL connection is established. The SSH connector 13 receives the public key of cell 2 through the network 9 and confirms whether or not the public key is registered in the cell data 14. If the public key is registered, the SSH connector 13 establishes SSH port forwarding between cells 0 and 2 using the encoded communication path. Specifically, the access from the web browser 21 of the user terminal 20 to the URL 16 is forwarded to the local port 17. Since the SSH port forwarding is established between cells 0 and 2, the access to the local port 17 leads to communication with the HTTP server 18 of the cell 2. As a result, the web console of cell 2 is displayed on the web browser 21 of the user terminal 20. The SSH port forwarding (HTTP over SSH) by the SSH connector 13 is implemented by the SSH client software retained by the BMCFW in cell 2 being installed.

Hereinafter, operations of the server system 10, particularly operations of cell 0, are explained with reference to FIGS. 4 and 5, and the flowcharts shown in FIGS. 6 and 7. Firstly, the operations for cell 0 to collect the public keys from cells 1 to 7 are explained with reference to FIGS. 4 and 6.

When attachment of cells 1 to 7 and activation of BMCFWs on cells 1 to 7 are confirmed (step S1 in FIG. 6), cell 0 receives the public keys of cells 1 to 7 through the network 9 for communication among the cells as indicated by arrows shown in FIG. 4 (step S2 in FIG. 6). The received information, i.e., the public keys, the IP addresses, the key types of the cells are registered as the cell data 14 as shown in FIG. 3 (authentication-information collecting process). The IP address of the cell can be acquired by referring to the source address of the IP packet upon the public key being received. The key type is included in the public key. The acquisition of the public key may be completed before port forwarding at the latest which will be explained later.

Upon the collection and registration of the public keys, whether or not an IP address identical to the IP address included in the collected data is included in the cell data 14 is determined (step S3 in FIG. 6). If the identical IP address is not included in the cell data 14 (step S3: NO in FIG. 6), information concerning the public keys and the IP addresses of the cells are newly registered in the cell data 14 (step S6 in FIG. 6). On the other hand, if an identical IP address is included in the cell data 14 (step S3: YES in FIG. 6), the already registered public key has to be updated. In this case, an IP address is searched from the cell data 14 (step S6 in FIG. 6), and the public key of the cell corresponding to the identical IP address is updated (step S5 in FIG. 6).

Hereinafter, the operations for the user to use the web console of cell 2 for management are explained with reference to FIGS. 5 and 7. The user performs SSL connection with cell 0 where an HTTPS server (secure HTTP server) operates using the web browser 20. In other words, cell 0 SSL-authenticates the user terminal 20 accessing thereto and performs the SSL connection (step S11 in FIG. 7, FIG. 5 at (1), and access authenticating process).

Upon using the web console of cell 2, the user clicks the URL 16 indicative of access to cell 2. Then, cell 0 initiates an SSH connection with cell 2 (step S12 in FIG. 7, and FIG. 5 at (3)). Cell 0 receives the public key of cell 2 through the network 9 (step S13 in FIG. 7). Whether or not the public key of cell 2 is registered in the cell data 14 is then determined (step S14 in FIG. 7).

If the public key of cell 2 is registered in the cell data 14 (step S14: YES in FIG. 7), SSH port forwarding is established between cells 0 and 2 (step S15 in FIG. 7). Then, the access from the web browser 21 of the user terminal 20 to the URL 16 is forwarded to the local port 17 (step S16 in FIG. 7, and FIG. 5 at (2)). Since the SSH port forwarding is established between cell 0 and cell 2, the access to the local port 17 leads to communication with the HTTP server 18 of cell 2 (relay connecting process). In other words, the web console of cell 2 is displayed on the web browser 21 of the user terminal 20 (step S17 in FIG. 7).

On the other hand, if the public key of cell 2 is not registered in the cell data 14 (step S14: NO in FIG. 7), error processing is performed (step S18 in FIG. 7). In the error processing, a message indicating that SSH port forwarding cannot be established is displayed on the web browser of the user terminal 20.

As explained above, according to the first embodiment, an SSL connection is securely established between the user terminal 20 and cell 0, and SSH port forwarding is securely established between the user terminal 20 and cell 2 through cell 0. As a result, secure web access to every cell and reduction in costs for purchasing and maintaining SSH certificates can be achieved even in a server system including a large number of web servers by providing one SSL certificate in the relay cell. In addition, SSH client software need not be installed in the user terminal 20 for cell 0 to perform an SSH connection, and the time-consuming management of the public keys of the SSH servers by the user can be omitted. As a result, a convenient computer system capable of being securely and easily accessed can be provided.

Although the case where the server system 10 includes multiple cells 0 to 7 is explained above, the server system 10 may include multiple server computers as computer modules each including a calculator and a storing unit similarly to the cell.

Hereinafter, modified examples of cell 0 are explained with reference to FIGS. 8 and 9. Cell 0 shown in FIG. 8 includes a cell data distributor 19 implemented by installation of a predetermined program in addition to the configuration of cell 0. The cell data distributor (distributor) 19 distributes the cell data 14 that is the key information of cells 1 to 7 to a relay cell such as cell 0 (authentication-information distributing process). The cell receiving the cell data 14 can perform SSH port forwarding explained above, i.e., connect the user terminal 20 to another cell similarly to cell 0 explained above. Therefore, switching of a relay cell becomes easy, and a fast secure connection can be established after the switching.

Cell 0 may preliminarily store the public key of each cell as cell data 14. In this case, cell 0 may not include the public key collector 11 as shown in FIG. 9.

The present invention is applicable to a computer system that includes multiple computer modules and is accessed through a network from a terminal of an administrator, for example, and therefore, has industrial availability.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed:

1. A system including a plurality of apparatuses, the plurality of apparatuses including at least first and second apparatuses, the first apparatus comprising:
    a collector configured to collect a plurality of authentication information from the plurality of apparatuses other than the first apparatus before a user terminal accesses the first apparatus, each of the plurality of authentication information being associated with one of the plurality of apparatuses other than the first apparatus, the user terminal being different from the plurality of apparatuses, and the user terminal being not included in the system;
    a storing unit configured to store the plurality of authentication information before the user terminal accesses the first apparatus;
    an authenticator configured to authenticate the user terminal when the user terminal accesses the first apparatus; and
    a relay connector configured to connect the user terminal to the second apparatus based on one of the plurality of authentication information which is associated with the second apparatus, if authentication by the authenticator succeeds.

2. The system according to claim 1, wherein the collector is configured to collect the one of the plurality of authentication information from the second apparatus upon detecting activation of the second apparatus.

3. The system according to claim 1, wherein the relay connector is configured to connect the user terminal to the second apparatus by port forwarding using an encoded communication path.

4. The system according to claim 1, wherein the plurality of apparatuses are connected through a LAN.

5. The system according to claim 1, wherein the plurality of apparatuses further include a third apparatus, and the first apparatus further comprises a distributor configured to distribute the plurality of authentication information stored in the storing unit to the third apparatus before the user terminal accesses the third apparatus.

6. An apparatus comprising:
- a collector configured to collect a plurality of authentication information from a plurality of other apparatuses before a user terminal accesses the apparatus, each of the plurality of authentication information being associated with one of the plurality of other apparatuses, and the user terminal being different from the plurality of other apparatuses;
- a storing unit configured to store the plurality of authentication information before the user terminal accesses the apparatus;
- an authenticator configured to authenticate the user terminal when the user terminal accesses the apparatus; and
- a relay connector configured to connect the user terminal to a first one of the plurality of other apparatuses based on one of the plurality of authentication information which is associated with the first one of the plurality of other apparatuses, if authentication by the authenticator succeeds.

7. The apparatus according to claim 6, wherein the collector is configured to collect the one of the authentication information from the first one of the plurality of other apparatuses upon detecting activation of the first one of the plurality of other apparatuses.

8. The apparatus according to claim 6, wherein the relay connector is configured to connect the user terminal to the first one of the plurality of other apparatuses by port forwarding using an encoded communication path.

9. The apparatus according to claim 6, wherein the apparatus is connected to the plurality of other apparatuses through a LAN.

10. The apparatus according to claim 6, further comprising a distributor configured to distribute the plurality of authentication information stored in the storing unit to a second one of the plurality of other apparatuses before the user terminal accesses the second one of the plurality of other apparatuses.

11. A non-transitory computer-readable recording medium storing a program causing a computer of an apparatus to execute:
- collecting a plurality of authentication information from a plurality of other apparatuses before a user terminal accesses the apparatus, each of the plurality of authentication information being associated with one of the plurality of other apparatuses, and the user terminal being different from the plurality of other apparatuses;
- storing the plurality of authentication information before the user terminal accesses the apparatus;
- authenticating the user terminal when the user terminal accesses the apparatus; and
- connecting the user terminal to a first one of the plurality of other apparatuses based on one of the plurality of authentication information which is associated with the first one of the plurality of other apparatuses, if authentication of the user terminal succeeds.

12. The non-transitory computer-readable recording medium according to claim 11, wherein collecting the plurality of authentication information comprises collecting the one of the authentication information from the first one of the plurality of other apparatuses upon detecting activation of the first one of the plurality of other apparatuses.

13. A method for an apparatus, method comprising:
- collecting a plurality of authentication information from a plurality of other apparatuses before a user terminal accesses the apparatus, each of the plurality of authentication information being associated with one of the plurality of other apparatuses, and the user terminal being different from the plurality of other apparatuses;
- storing the plurality of authentication information before the user terminal accesses the apparatus;
- authenticating the user terminal when the user terminal accesses the apparatus; and
- connecting the user terminal to a first one of the plurality of other apparatuses based on one of the plurality of authentication information which is associated with the first one of the plurality of other apparatuses, if authentication of the user terminal succeeds.

14. The method according to claim 13, wherein collecting the plurality of authentication information comprises collecting the one of the authentication information from the first one of the plurality of other apparatuses when activation of the first one of the plurality of other apparatuses is detected.

15. The method according to claim 13, wherein connecting the user terminal is performed by port forwarding using an encoded communication path.

16. The method according to claim 13, further comprising distributing the plurality of authentication information stored to a second one of the plurality of apparatuses before the user terminal accesses the second one of the plurality of other apparatuses.

* * * * *